United States Patent [19]

Lapierre

[11] Patent Number: 4,920,422

[45] Date of Patent: Apr. 24, 1990

[54] PROCESSES AND AUTOMATIC DEVICES FOR HIGH-RESOLUTION WRITING ON A SUPPORT BY PROJECTING DROPS OF COLORED LIQUIDS

[76] Inventor: Gilles H. Lapierre, 33 rue de la République, 13500 Martigues, France

[21] Appl. No.: 324,607

[22] Filed: Mar. 16, 1989

[30] Foreign Application Priority Data

Mar. 18, 1988 [FR] France ................................ 88 03767

[51] Int. Cl.[5] ..................... H04N 1/393; G01D 15/18; G06F 15/62

[52] U.S. Cl. ....................................... 358/296; 346/29; 346/140 R; 358/77; 364/520; 364/929.3

[58] Field of Search ............... 346/140 R, 29; 358/75, 358/77, 296; 400/126, 17, 18, 56; 364/520, 929.3

[56] References Cited

U.S. PATENT DOCUMENTS 3,867,882 2/1975 Ahlgren ............................. 400/126
4,358,781 11/1982 Yamamori et al. .
4,547,786 10/1985 Logan .................................. 358/77
4,580,914 4/1986 Rich ..................................... 400/56

FOREIGN PATENT DOCUMENTS 430929 1/1973 Australia .
2601265 1/1988 France .

OTHER PUBLICATIONS

Search Report 88 03767.

*Primary Examiner*—Bruce A. Reynolds
*Assistant Examiner*—Scott A. Rogers
*Attorney, Agent, or Firm*—Ladas & Parry

[57] ABSTRACT

This invention relates to a device for automatically writing a polychrome graphic on a fixed support, comprising a tool-holder which bears a plurality of nozzles perpendicular to the support, each projecting a liquid of determined color and a computer which controls the displacements of the tool-holder, in the memory of which are recorded the coordinates and color of a network of dots comprising said polychrome graphic.

11 Claims, 10 Drawing Sheets

PROCESSES AND AUTOMATIC DEVICES FOR HIGH-RESOLUTION WRITING ON A SUPPORT BY PROJECTING DROPS OF COLORED LIQUIDS

FIELD OF THE INVENTION

The present invention relates to processes and automatic devices for high-resolution writing on a support by projecting drops of coloured liquids.

BACKGROUND OF THE INVENTION

The technical sector of the invention is that of the construction of automatic machines or robots for writing various graphics on diverse supports.

One application of the processes and devices according to the invention is the mass-production of flat panels bearing legends and/or drawings or graphics, for example advertizing boards, displays, indicator panels, decorative or advertizing patterns on various supports, packings, etc. . . .

The processes and devices according to the invention also make it possible automatically to write graphics on supports having a surface with a slight curvature, for example on car bodies, curved panels, various industrial products, on curved walls.

The coloured liquids which may be used on the devices according to the invention may be paints, inks or any other liquid vehicle containing a colorant.

The robots according to the invention make it possible to write letters, figures or polychrome graphics which are made by projecting drops of coloured liquid which produce very small coloured dots, very close to one another, with the result that a very good resolution is obtained and the eye cannot perceive any discontinuity in the graphics.

The production of so-called high-resolution or high-quality graphics requires very numerous operations and very numerous controls, since the number of dots is very high.

Such controls are compulsory not only to check the parameters influencing the circulation of the coloured liquids, but also to check that the different films of the support or supports have been correctly produced.

Controls during execution of the graphics by automatic devices which project drops of liquid, must be precise and rapid in order to avoid the automatic device being blocked due to poor projection of the liquids and in order to check that the film or films have been correctly produced. The displacements of the tools for projecting the coloured liquids and the results obtained must be able to be checked at any instant.

It is recalled that the supports of diverse composition adapted to bear high-resolution graphics must comprise one or more sub-layers called films. These sub-layers ensure protection of the support and the quality of the graphics.

Various processes for writing graphics on various supports are known.

One of the most used techniques is the technique of printing books or newspapers in printing houses equipped with rotary presses which are very large machines. This technique is reserved for printing on paper or on sheets and for very large numbers of copies.

Computer printers used for writing data or simple graphics on strips of paper, are known. In particular, ink jet computer printers exist, which comprise an ink projecting nozzle equipped with a piezoelectric ceramic element which divides the jet of ink into drops.

In the known ink jet printers, printing is effected on a support, for example on a strip of paper, which advances in front of the ink projecting nozzle and the latter comprises means for electrically charging the drops of ink then for deviating them electrically in a direction perpendicular to the direction of displacement of the support to be printed.

Plotting tables are also known, associated with a computer which controls relative displacements of a plotting stylus and of the table along two axes perpendicular to each other and parallel to the plane of the table.

Painting robots are also known which comprise a gun supported by an articulated arm which makes it possible to apply coats of paint on a support.

The processes and devices according to the invention combine in novel manner part of the techniques of projection of drops of liquid used in ink jet printers and part of the techniques used in plotting tables to obtain a relative displacement of the support with respect to the writing tool.

FR-A-2 601 265 (CHERUBIN-GRILLO) describes a device for printing, dot by dot, a polychrome image on a fixed support which comprises a projecting head, adapted to be displaced along three rectangular axes, which bears a plurality of nozzles whose axes converge at a point close to the support. Each nozzle projects a liquid of a determined colour and the colours mix. The displacements of the projecting head are controlled by signals resulting from information recorded in a microprocessor.

One object of the present invention is to provide means for automatically mass-producing, at one time, high-resolution graphics composed of very small coloured dots which are very close to one another.

A further object of the invention is to provide an automatic machine or robot which comprises means for creating on a screen a graphic to be produced which may be polychrome and for automatically reproducing this graphic on a support which may or may not be flat.

Another object of the invention is to provide a machine capable of automatically reproducing, on various supports, an existing graphic, by enlarging it or reducing it or possibly modifying it, the colours being respected or modified.

Yet another object of the invention is to provide a robot for writing graphics which comprises means for automatically controlling correct execution of the graphics without being detrimental to the high-resolution qualities thereof.

SUMMARY OF THE INVENTION

The objects of the invention are attained by a process which comprises the following successive operations of:

mounting a plurality of nozzles, each projecting a liquid of a determined colour, on a tool-holder which is placed in front of said support and which is adapted to be displaced along three rectangular axes of which one is perpendicular to said support and automatically controlling the displacements of said tool-holder by a central processing unit with the result that each outlet orifice of a nozzle scans line by line a surface parallel to said support, which nozzles are perpendicular to said support and parallel to one another and are offset in the direction perpendicular to the scanning lines, so that they scan different lines, recording in the memory of said central unit the coordinates of a network of dots of the graphic and the colour of each dot and during the displacements of the carriage, measuring the successive real positions of each nozzle, comparing them with the coordinates recorded in the memory and, when the real position of a nozzle which projects a liquid of a determined colour coincides with the coordinates of a dot of the graphic of this same colour, the central unit controls the ejection of a drop of liquid via said nozzle onto said support so that a high-resolution polychrome graphic is obtained thereon which is composed of a network of juxtaposed monochromatic dots.

A device according to the invention comprises a tool-holder which is adapted to be moved by servo-motors along three rectangular axes of which one is perpendicular to said support, which tool-holder bears nozzles for projecting coloured liquids of different colours and a central processing unit which automatically controls said servo-motors to displace said tool-holder in front of said support along parallel scanning lines and which controls the projection of coloured liquid by said nozzles, and said tool-holder bears a plurality of tools each equipped with one or more parallel nozzles which are offset with respect to one another in the direction perpendicular to the scanning lines.

According to a preferred embodiment, a device according to the invention comprises a horizontal rail along which a vertical rail is displaced by a first servo-motor, along a first axis (YY') parallel to said support and a carriage which is displaced along said vertical rail by a second servo-motor along a second axis (ZZ') parallel to said support and a tool-holder which is mounted on said carriage and which is displaced by a third servo-motor along a third axis (XX') perpendicular to said support in which said horizontal rail is constituted by one side of a fixed, rigid, rectangular frame placed in front of said support and said vertical rail is displaced inside said frame.

The invention results in the possibility of automatically writing on various supports graphics which are constituted by very fine dots very close to one another and which therefore present a high resolution.

The invention also results in automatic machines or robots which may be programmed to produce the same graphic in series on a plurality of supports.

The processes and machines according to the invention make it possible to produce graphics by dots which are constituted by small juxtaposed spots of coloured liquid. Graphics may be made in several colours at the same time.

The machines according to the invention are equipped with sensors for detecting the real position of the tools and with electronic comparison means which compare at any instant the real position measured with the theoretical position controlled by the central unit.

These comparison means make it possible to interrupt the projection of coloured liquid when they reveal too great a difference between the real position and the theoretical position of the liquid projecting tools, which guarantees good quality of the graphics made by the machine.

A machine according to the invention is provided with a computer-assisted image creation unit and it can automatically reproduce, in series, on various supports, a graphic created on the screen of the image creation unit.

It also enables an existing graphic to be automatically reproduced in series, after possibly having modified it.

A machine according to the invention comprises a sensor or any other equivalent means for shape analysis which is displaced in front of a curved support that it scans line by line. It makes it possible previously to note the shape of the surface of a curved support and to displace the tools automatically, so that the outlet orifices of the nozzles for projecting the coloured liquids remain at a constant distance from the support despite the curvature thereof and the nozzles are constantly perpendicular to the surface of the support, with the result that the coloured dots projected on the support conserve the same dimensions.

A machine according to the invention may comprise an electronic memory for conserving the data necessary for automatically reproducing a graphic. These data may be stored on peripheral memories (disks, floppy disks), which make it possible automatically to reproduce, several times, the same graphic on the same machine or on several machines.

BRIEF DESCRIPTION OF THE DRAWINGS

The invention will be more readily understood on reading the following description with reference to the accompanying drawings, in which.

FIG. **2*a*** is a view in perspective of an embodiment of the carriage and of the tool-holder.

Figure 3:
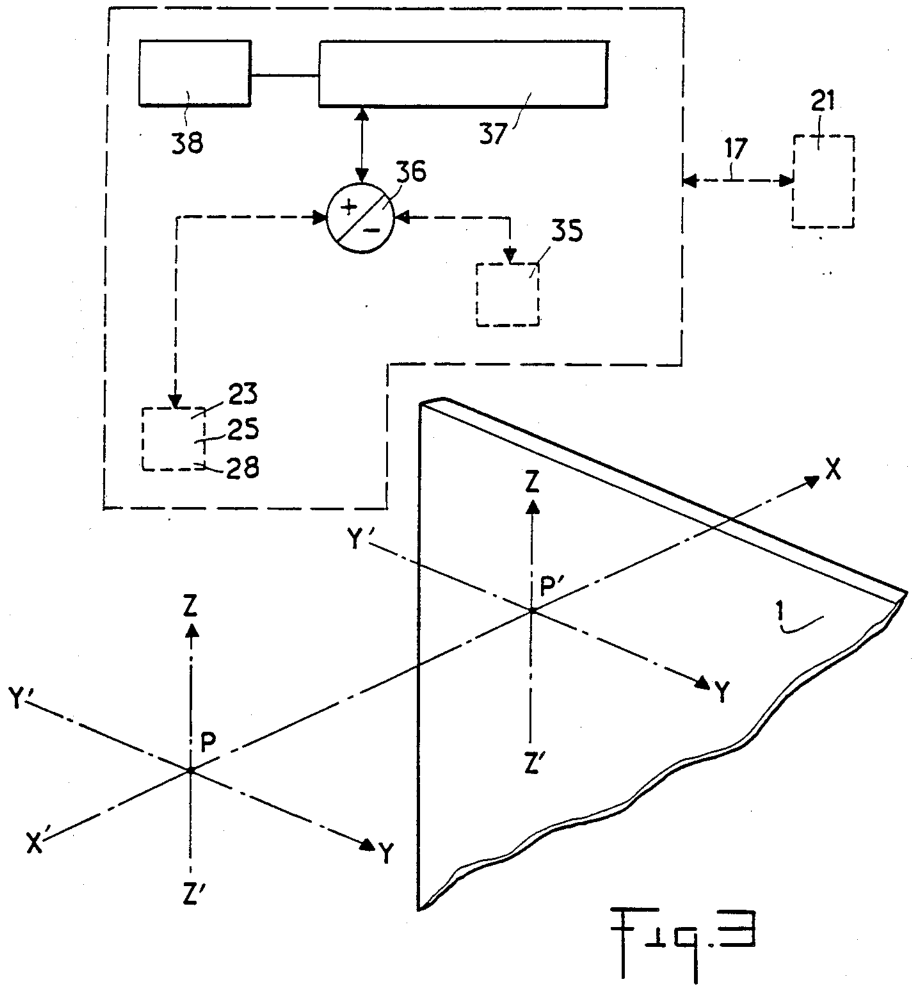

FIG. 3 is a partial schematic view of the support and of the electronic circuits for servo-controlling the position of the tools.

Figure 4:
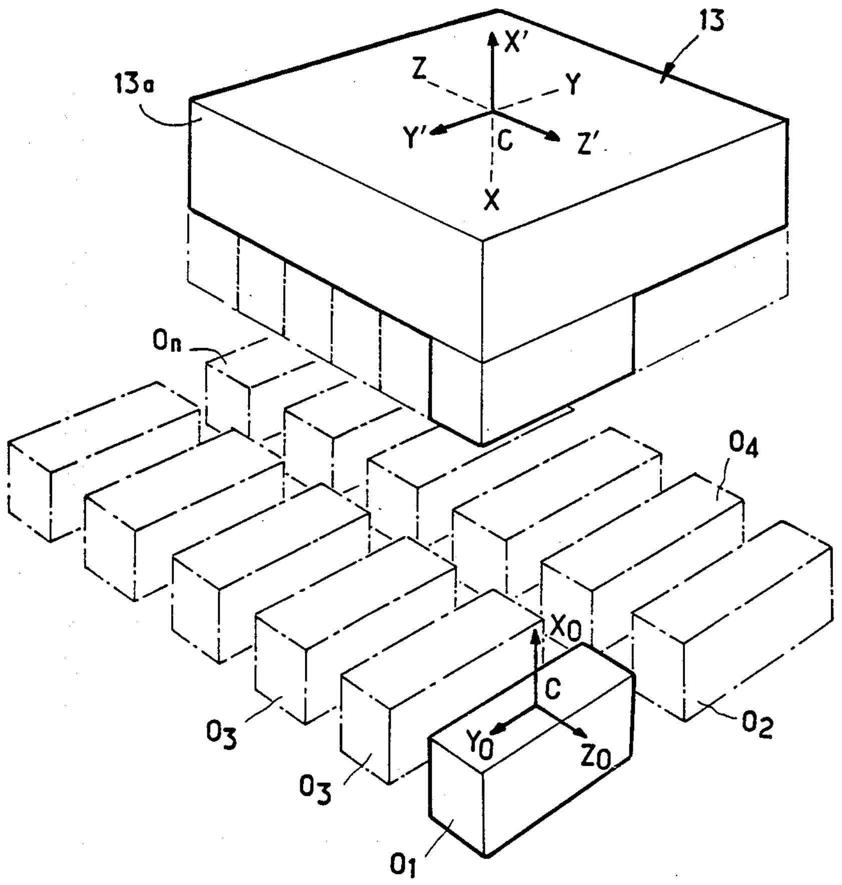

FIG. 4 is a schematic view in perspective of the tool-holder.

Figure 5:
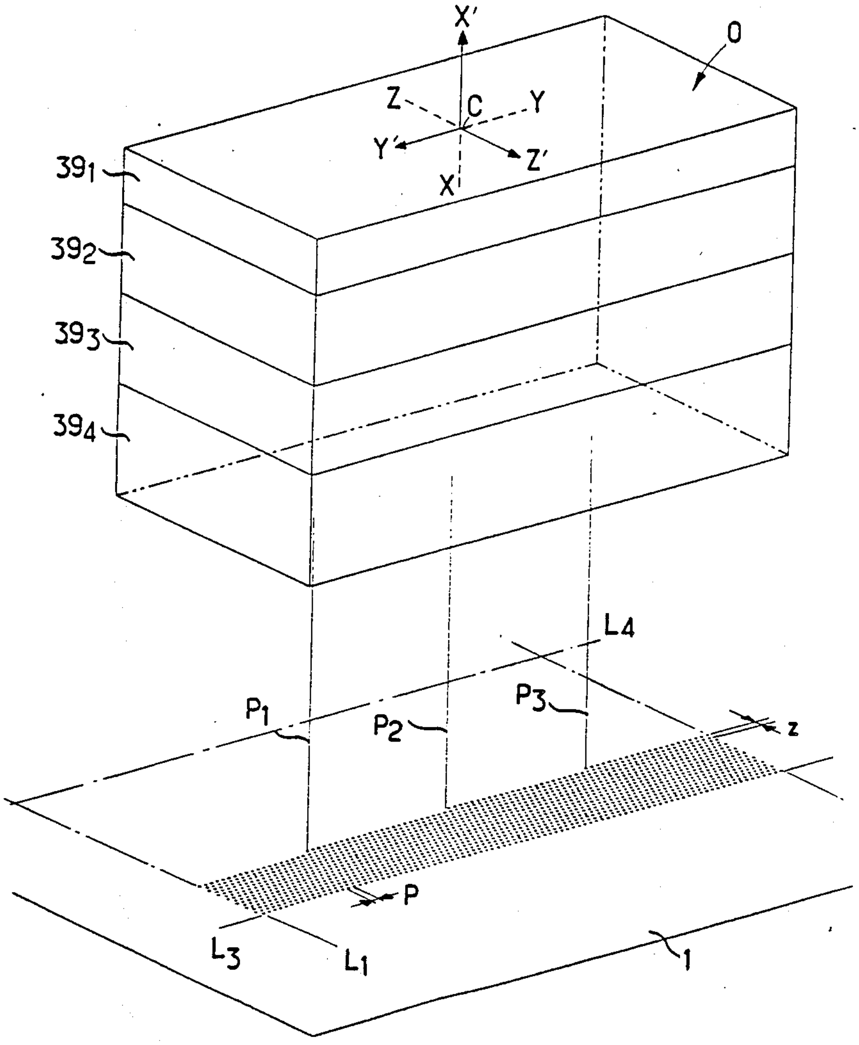

FIG. 5 is a view in perspective of a tool comprising three nozzles.

Figure 6:
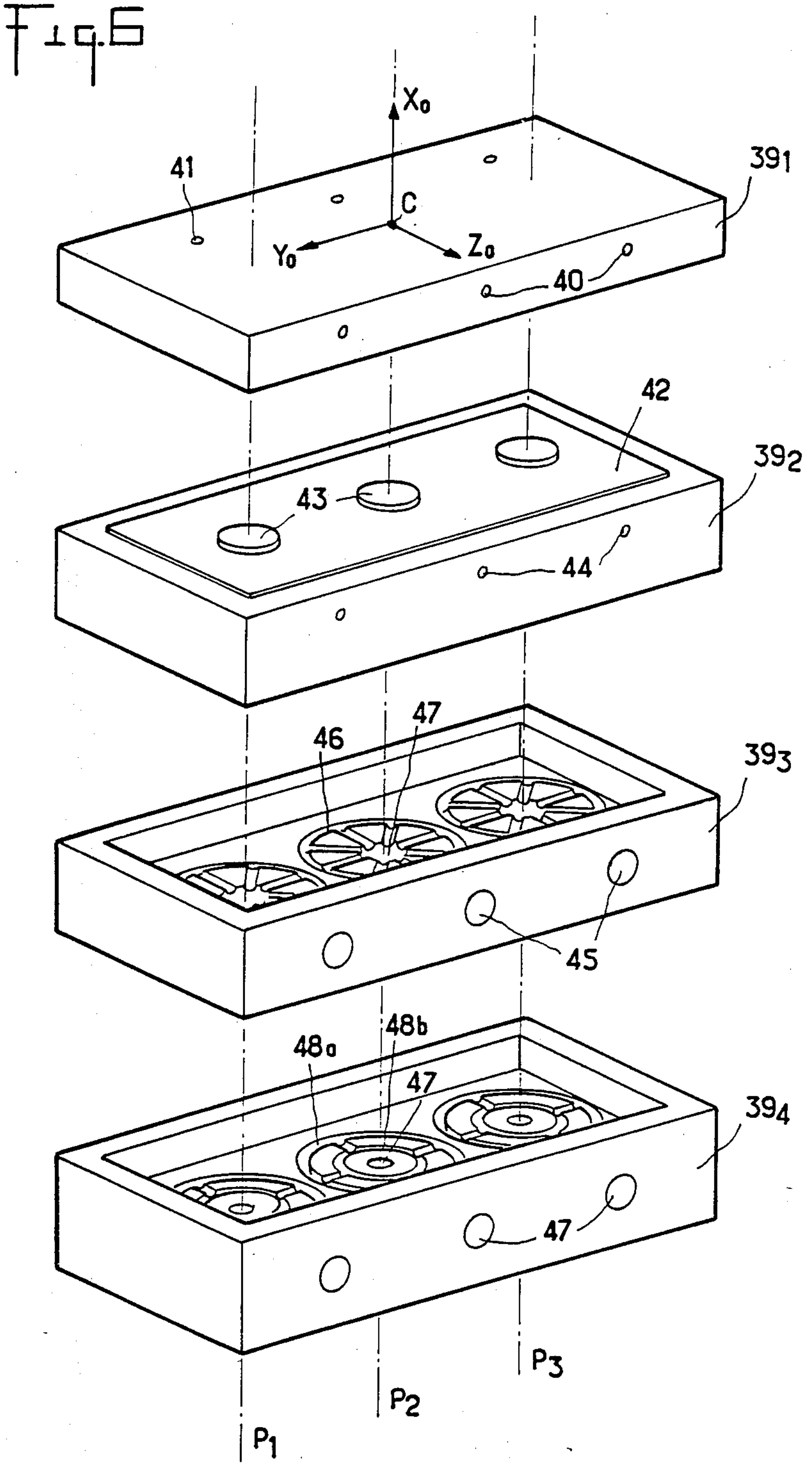

FIG. 6 is an exploded view of FIG. 5.

Figure 7:
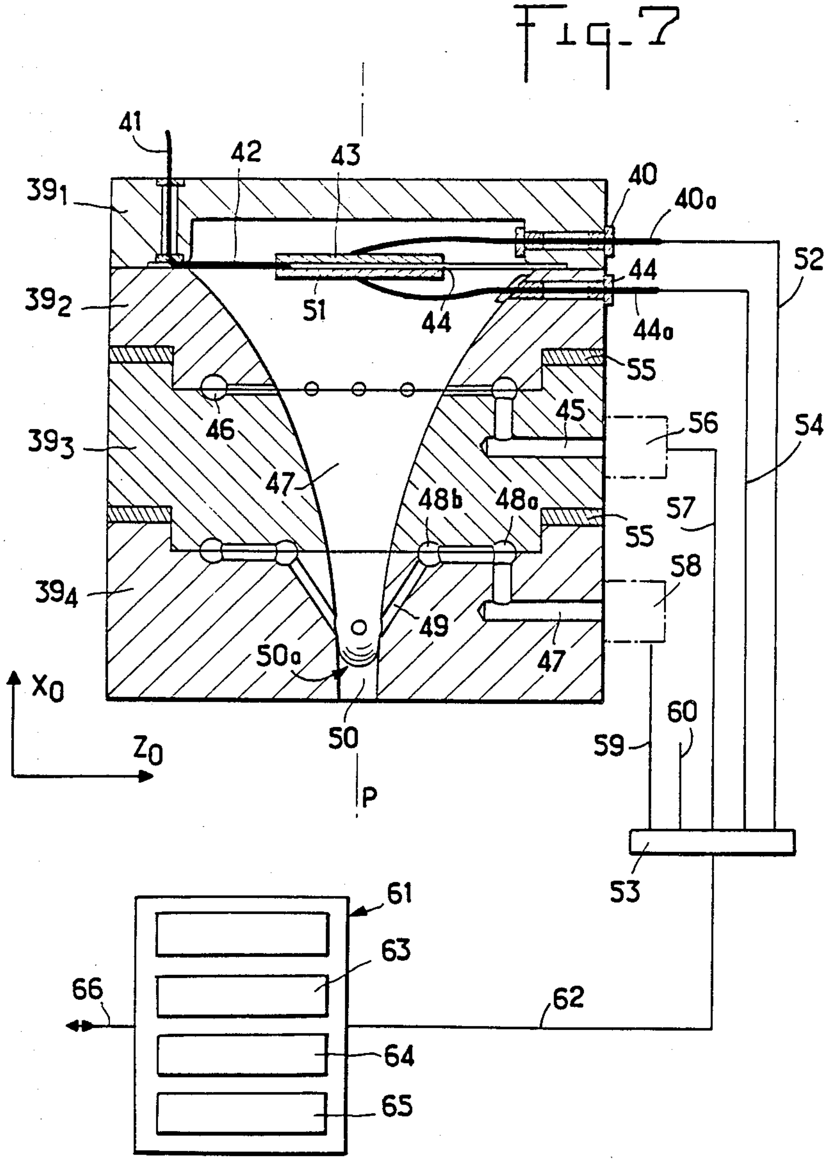

FIG. 7 is a transverse section of FIG. 6 passing through the axis of a nozzle.

Figure 8:
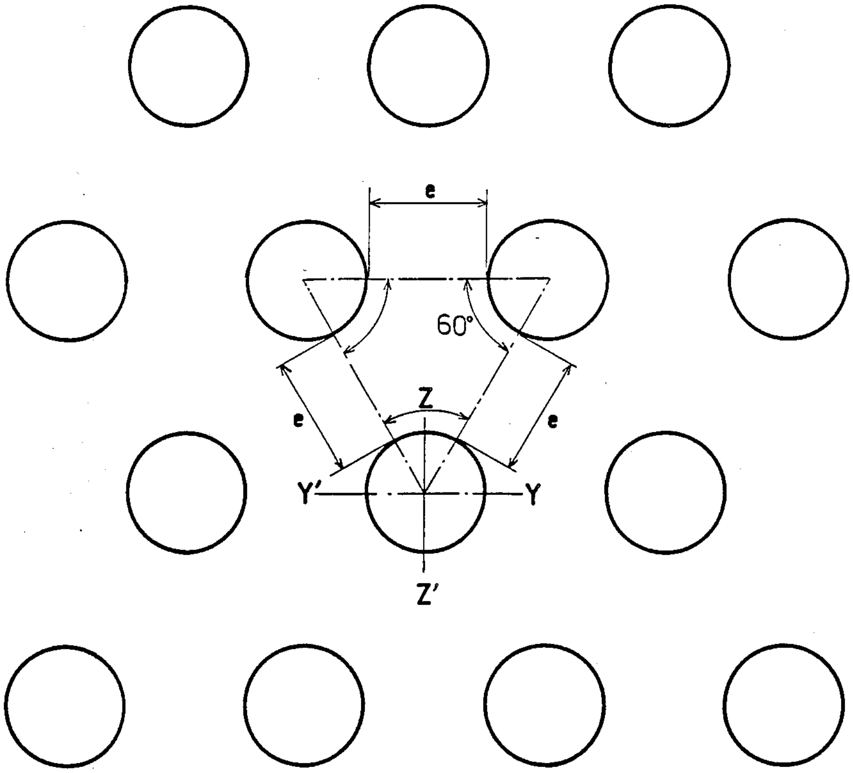

FIG. 8 is a view on a larger scale showing the quincunx arrangement of the coloured dots.

Figure 9:
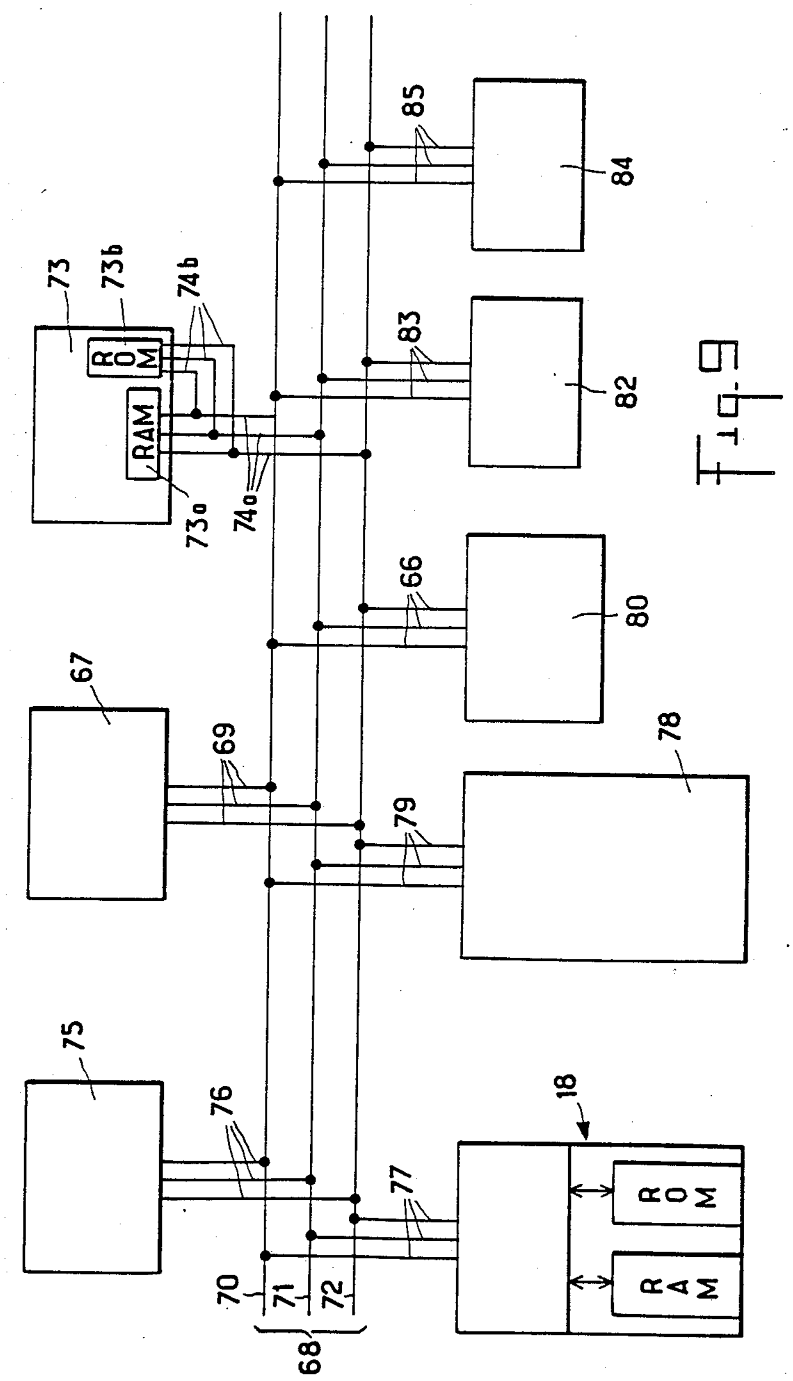

FIG. 9 is a diagram of the central control station.

DETAILED DESCRIPTION OF THE DRAWINGS

Figure 1:
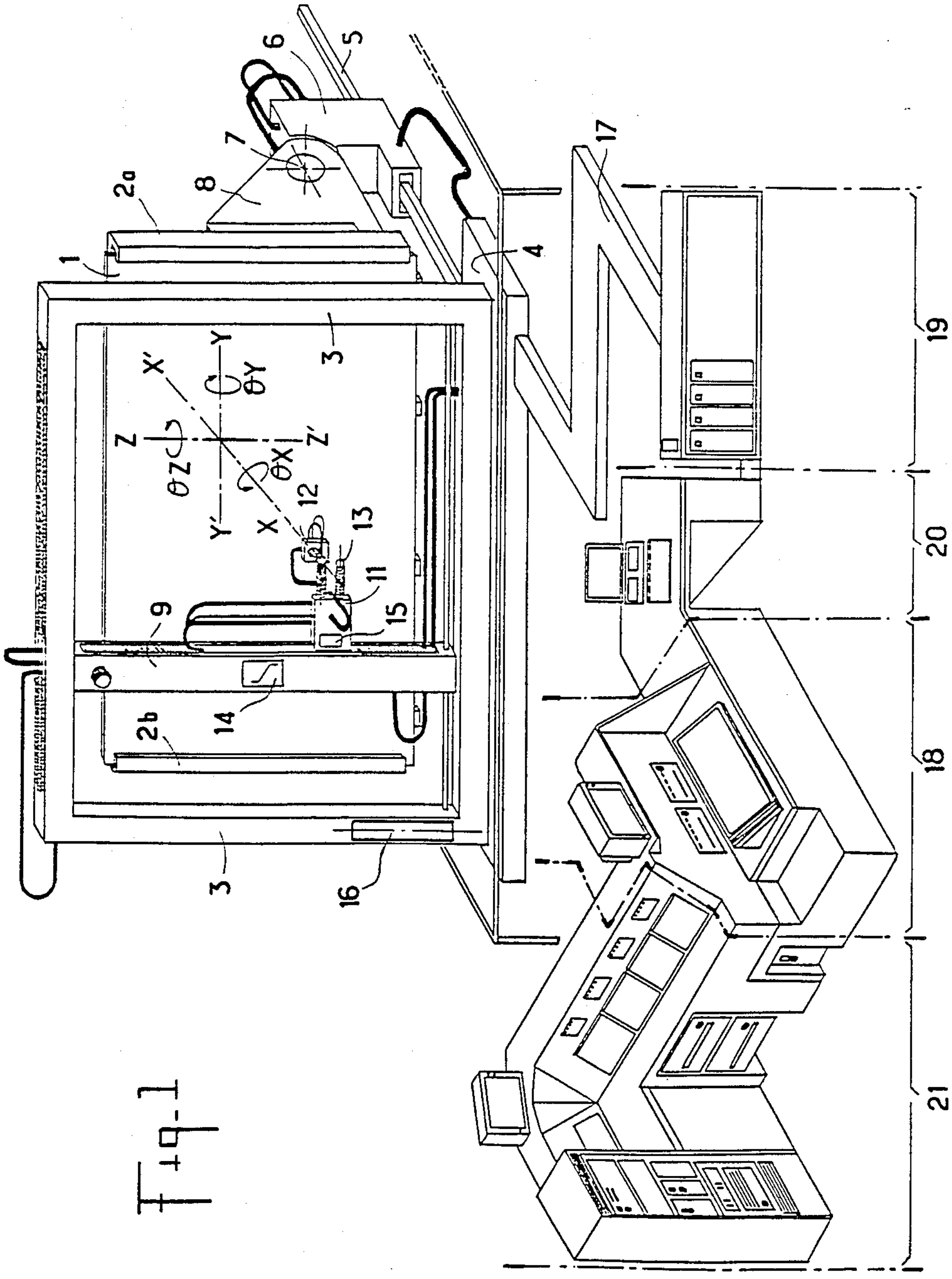
FIG. 1 is an overall view of a device according to the invention.

Referring now to the drawings, FIG. 1 represents an overall view in perspective of an automatic machine according to the invention, for automatically writing a polychrome graphic on a support 1, which is, for example, a vertical flat panel engaged in two vertical slideways **2*a* and 2*b***.

The machine comprises a fixed rectangular vertical frame 3 which acts as work table and which is parallel to the plane defined by the two slideways **2*a*, 2*b*. The frame 3 is mounted on a fixed base or frame 4 which comprises two slideways or guiding rods 5** perpendicular to the plane of the frame.

A mobile support 6 slides on the slideways 5. It is driven by a motor (not shown). The mobile support 6 bears a horizontal pin 7 around which two fork joints 8 bearing the slideways **2*a* and 2*b*** pivot.

Displacement of the support 6 makes it possible to move the slideways **2*a*, 2*b* away from the frame 3 in order to replace the panel 1. Pivoting about pin 7 facilitates introduction of the panel in the slideways 2*a*, 2*b***.

Three tri-rectangular axes XX', YY' and ZZ' have been shown in FIG. 1.

The fixed frame 3 bears a vertical arm 9 which slides on two guiding rods or in two slideways parallel to the horizontal sides of the frame 3, with the result that the arm 9 may be displaced parallel to the horizontal axis YY'. Such displacements are controlled for example by a servo-motor 10, shown in FIG. 2, which drives a micrometer screw on which is mounted a nut fast with the arm 9, in rotation.

Figure 2:
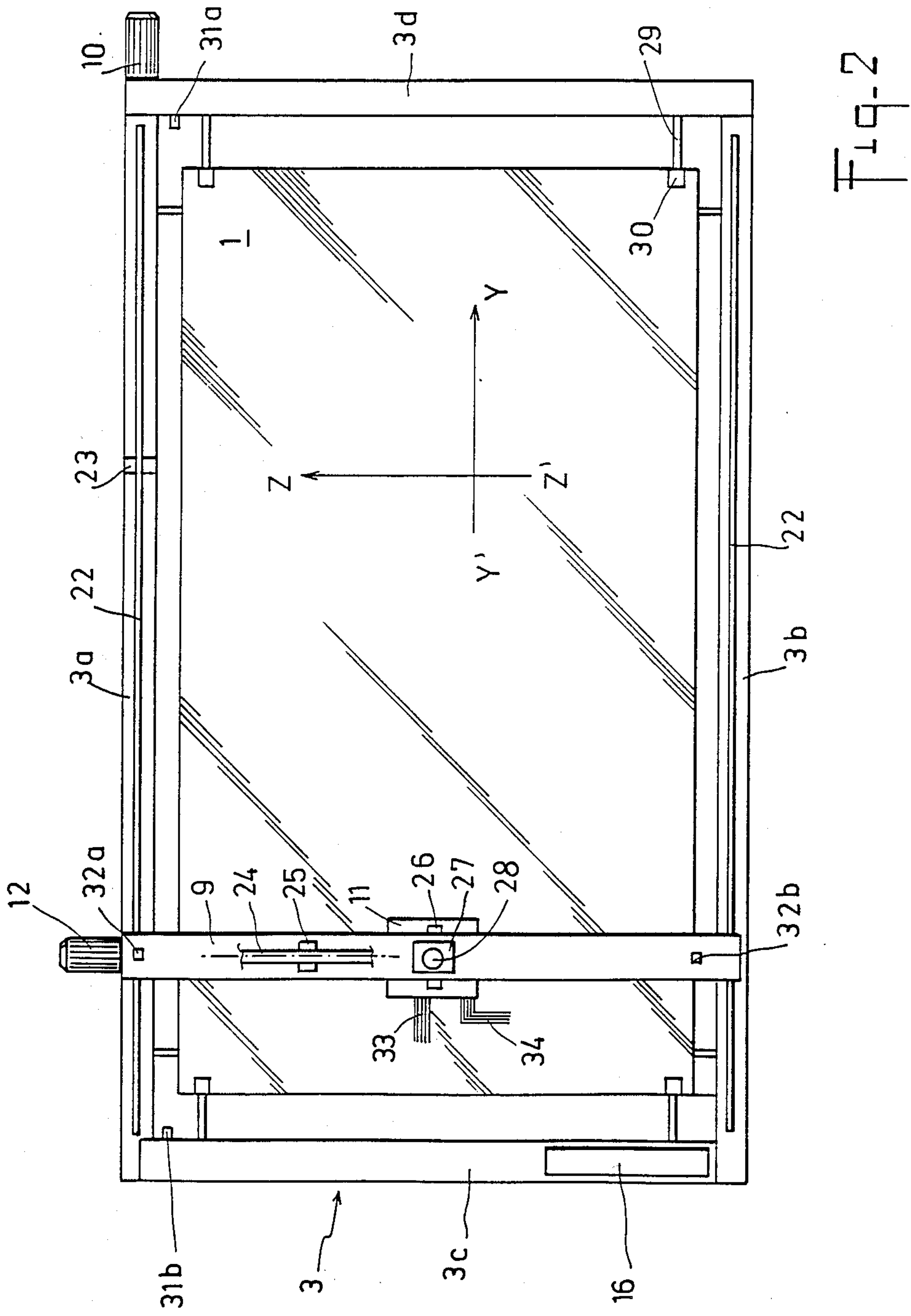
FIG. 2 is a front view of the work table of a device according to the invention.

The arm 9 bears a carriage 11 which is adapted to be displaced along the arm 9 therefore parallel to the vertical axis ZZ', for example by a servo-motor 12, shown in FIG. 2, which drives a micrometer screw housed in the arm 9, on which the carriage 11 is mounted via a nut.

The carriage 11 bears a shape-analysis device 12 which is for example a mechanical sensor or an induction or capacitive sensor which serves to scan the support 1 line by line and automatically to measure the distance thereof in the direction of axis XX' if the support is curved. This reading takes place in a preliminary phase before beginning to write the graphic and the measurements taken are recorded in the memory of the central unit.

The carriage 11 also bears an assembly of tools which comprise nozzles for projecting coloured liquid and which are mounted in a tool-holder 13 which is adapted to be mechanically displaced along axis XX' perpendicular to axes YY' and ZZ'.

The device advantageously further comprises means for obtaining rotations of the tools about axes parallel to the plane of the frame 3, i.e. rotations $\theta z$ and $\theta y$ about axes ZZ' and YY'. Such rotations make it possible to maintain the coloured liquid projecting nozzles perpendicular to the surface of the support when said surface is not flat. The arm 9 bears a ventilation device 14. The carriage 11 comprises a device 15 for drying the coloured liquids.

The frame 3 bears on one of its vertical sides a tool magazine 16 which is adapted to be displaced vertically by a servo-motor. When projection tools are to be changed, the arm 9 is brought against that side of the frame bearing the magazine 16, the magazine 16 and the carriage 11 are placed at the same height and the tools are interchanged by devices similar to those equipping numerical control (N/C) machine-tools.

The table 4 is connected by leads and by tubes located in a sheath 17 to a control station, which is schematically shown at the bottom of the Figure.

The control station comprises a computer-assisted image creation section 18, comprising an image analysis and digitalization device. It comprises a section 19 in which are stored the various coloured liquids in separate recipients. It comprises a section 20 for treatment of the coloured liquids which is equipped with a cleaning device. Finally, it comprises a central unit 21 equipped with a central processor with its read-only and read-write memories, keyboard, screen, etc. . . .

Successive reference values are sent by the central unit to the servo-motors which control the displacements of the arm 9, the carriage 11 and the tool-holder 13, with the result that the liquid projecting nozzles move within the frame 3, scanning the horizontal lines one after the other, the orifices of the nozzles being maintained at a very short, constant distance from the plane of the support 1, with the result that the outlet orifices of the nozzles scan a flat or curved surface parallel to the surface of the support. The central unit also controls liquid projecting means with which the nozzles are equipped in order to project on each point of the support a spot of liquid of a determined colour.

From the graphic which was created on the screen of the computer-assisted image creation device 18 or from an existing graphic which it is desired to copy, the central unit is programmed in order to bring the outlet orifices of the various coloured liquid projecting nozzles, borne by the tool-holders 13, successively opposite each point of the support and to control projection at that point of a small spot of determined colour and the graphic is thus produced by very fine dots which are very close to one another.

The coloured dots which are circular are advantageously disposed in quincunx in order to cover the maximum surface of the support.

FIG. 1 shows a frame 3 and a support 1 which are vertical. It is specified that they may advantageously be horizontal.

FIG. 2 is a view in elevation of the frame 3 and of a support 1 which are vertical, or a plan view in the case of the table and support being horizontal.

The rectangular frame 3 is composed of four rigid bars which constitute its four sides, two reinforcements 3*a*, 3*b* parallel to axis YY' and two reinforcements 3*c* and 3*d* parallel to axis ZZ'.

FIG. 2 shows the arm 9 which moves along two guiding rails 22 borne by sides 3*a* and 3*b* of the frame 3.

Displacement is controlled for example by a servo-motor 10 which drives an endless screw. A displacement sensor 23 of any known type measures the displacements of the arm 9 and makes it possible to know, at any instant, the exact position thereof along axis YY'.

The sensor 23 may either be a sensor detecting the revolutions of the endless screw, or a magnetic or optical sensor of linear displacements.

The carriage 11 is adapted to move along arm 9, for example by a servo-motor 12 driving an endless screw. It is guided by a guide rail 24.

A sensor 25 measures the displacements of the carriage and enables its real position along axis ZZ' to be known.

The carriage 11 bears guiding rails 26 parallel to axis XX' perpendicular to the plane of the Figure, along which a tool-holder 13 is displaced by an actuator 27.

A sensor 28 makes it possible to measure the displacements of the tool-holder parallel to axis XX' and to know the real position along this axis.

In this way, the three actuators 10, 12 and 27 make it possible to displace the projection nozzles borne by the tool-holder along three axes XX', YY' and ZZ' and the three sensors 23, 25 and 28 make it possible to know at any instant the real coordinates of the orifice of each nozzle with respect to a reference system along three tri-rectangular axes.

The tool-holder 13 may advantageously be mounted to pivot about two axes parallel to axis ZZ' and to axis YY', with the result that a system is obtained having five degrees of freedom, which makes it possible to maintain the projecting nozzle perpendicular to the support, in the case of the latter being curved.

In that case, the device also comprises sensors which measure the angles of rotation about axes parallel to ZZ' and YY'.

FIG. 2 shows a support 1 which is in abutment on a crossworked reinforcement 29 which is connected to the frame 3 and which comprises gripping elements 30 which tighten on the support.

In a variant, the support may be fixed and, in that case, spacer members are interposed between frame 3 and the support.

The frame 3 bears end-of-stroke switches 31*a*, 31*b* which limit the stroke of the arm parallel to axis YY', end-of-stroke switches 32*a*, 32*b* which limit the stroke of the carriage 11 parallel to axis ZZ' and end-of-stroke switches (not shown in the Figure) which limit the stroke of the tool-holder parallel to axis XX'.

The tool-holder is connected to the central control station by electrical leads 33 and by pneumatic pipes 34.

The magazine 16 which contains coloured liquid injection tools and which makes it possible automatically to interchange the tools mounted on the tool-holder, is seen on side 3*c* of frame 3.

The frame 3 comprises electrical leads, pneumatic leads and actuator leads on which are connected the leads and pipes for connection between the frame 3 and the central control station.

Figure 2A:
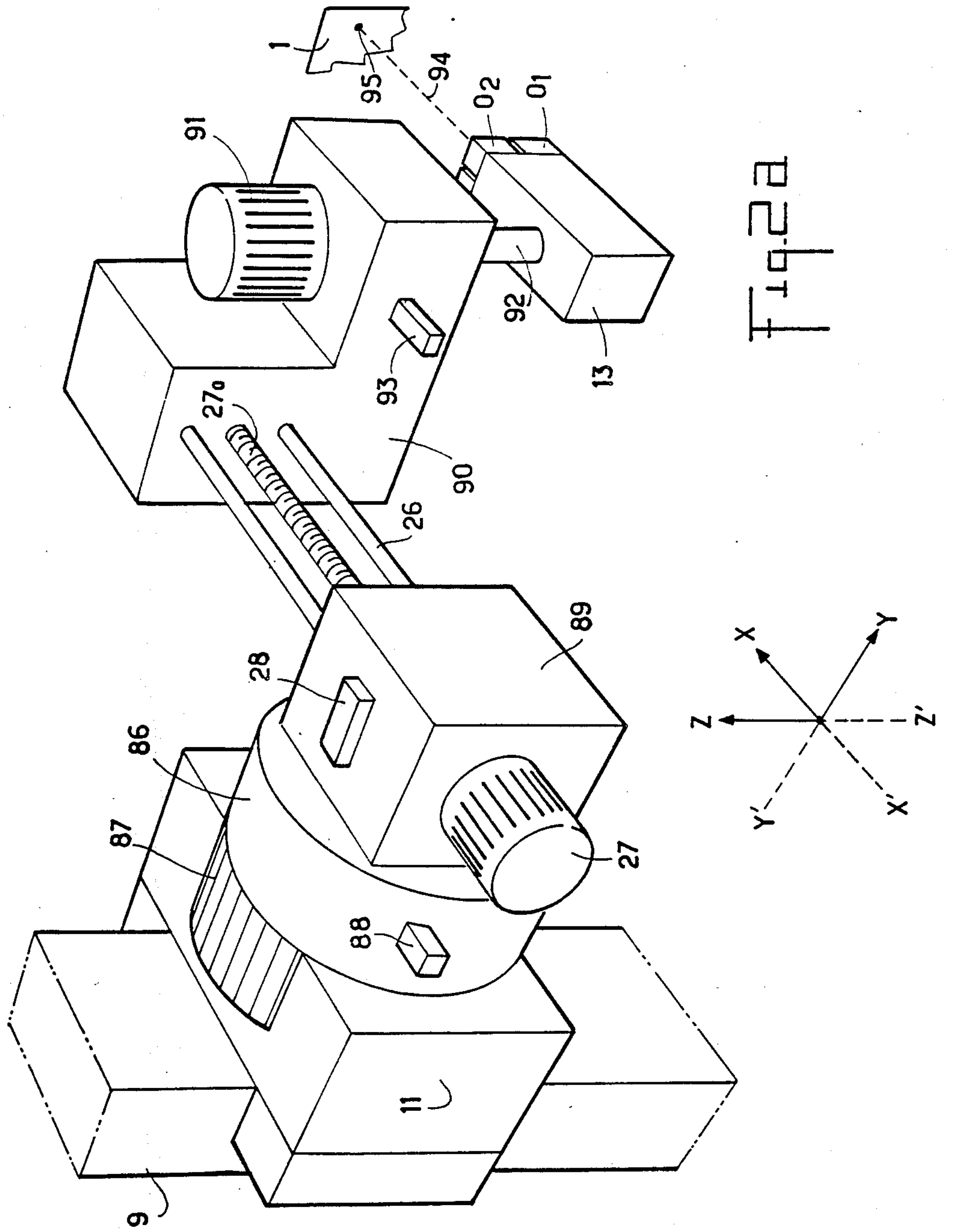

FIG. 2*a* is a view in perspective on a larger scale which shows the carriage 11 which slides along the arm 9 parallel to axis ZZ'. Carriage 11 bears a plate 86 which is driven in rotation about an axis parallel to axis YY' by a servo-motor 87. A sensor 88 measures the real rotation of the plate and sends the signal of measurement to a comparator which forms part of an open loop of the servo-motor 87.

The rotary plate 86 bears a support 89 on which are mounted guide rods, slideways or rails 26 parallel to axis XX'. The support 89 bears a servo-motor 27 which drives in rotation an endless screw 27*a* on which is screwed a tool-holder support 90 which slides on the slideways 26. A sensor 28 measures the displacement of the tool-holder support parallel to axis XX', for example by measuring the number of revolutions of the screw 27*a*.

The tool-holder support 90 bears a servo-motor 91 which drives in rotation a shaft 92 parallel to axis ZZ'. A sensor 93 measures the angle of rotation. Shaft 92 bears a tool-holder 13 in which are mounted tools 01, 02 . . . 0n which each comprise one or more nozzles for projecting a jet of coloured liquid 94 which is parallel to axis XX' and which prints a coloured dot 95 on a support 1 placed opposite the tools.

FIG. 3 schematically shows the position P of a tool, i.e. the outlet orifice of one of the coloured liquid projecting nozzles. Dot P' is the projection of dot P on the support 1 along axis XX'.

Let Q be the theoretical dot of which the coordinates along the three axes are sent by the central unit as reference points to the three servo-motors 10, 12 and 27.

The upper part of FIG. 3 shows a diagram of the electronic circuits for monitoring the coincidence between points Q and P'.

This diagram shows the three position sensors 23, 25, 28 shown in FIG. 2. Reference 35 represents a memory of the central unit, in which are found at any given instant the reference values which determine the theoretical coordinates of a dot.

Reference 36 represents comparators which compare the value measured by each sensor 23, 25, 28 with its theoretical value. Each of these comparators forms part of a local open-loop of a servo-motor 10, 12 or 27.

When the measured coordinates of a nozzle projecting a liquid of a determined colour coincide with the theoretical coordinates of a point of the graphic of the same colour recorded in the memory of the central computer, the comparator 36, which may form part of the central unit, emits a signal and the central unit sends to the nozzle in question a signal which controls projection by this nozzle of a very fine drop of liquid which produces on the support 1 a monochrome spot P' which coincides with the theoretical dot 2.

After printing of each dot P', an electronic marking control device 37, for example a video camera, checks that dot P' is well positioned on the support.

If dot P' does not perfectly correspond to the position of the theoretical dot Q, a printing corrector device 38 cancels the impact of dot P' by controlling the ejection on this dot of a blanking liquid and the cycle of printing of this same dot P' is resumed again.

FIG. 4 shows a schematic view in perspective of a tool-holder 13 bearing a plurality of tools 01, 02 . . . 0n, the number n being any one, for example equal to 12 in the case of the Figure.

The tool-holder 13 comprises a parallelepipedic case or casing 13*a* in which the various tools 01, 02 . . . 0n are mounted side by side, whilst being aligned along several lines and columns parallel respectively to axes ZZ' and YY'. Each tool comprises one or more nozzles for projecting liquid in a direction parallel to axis XX'.

All the tools have the same general parallelepipedic shape and the position of each tool is known perfectly since the position of a mark associated with each tool is known, for example the position of the centre C of the upper face.

The coordinates of each tool are deduced by addition of constants of the coordinates of a mark associated with the tool-holder, for example the centre C' of the upper face of the casing 13*a*.

The tools are assembled by joining each tool with the adjacent tools, for example by catches or tenons engaged in grooves or mortices.

FIG. 5 is a schematic view in perspective of a tool 0 placed above a horizontal flat support 1.

Tool 0 has a laminated structure, i.e. it is composed of a plurality of superposed rectangular plates $\mathbf{39}_1$, $\mathbf{39}_2$, $\mathbf{39}_3$, $\mathbf{39}_4$, in which are made conduits for liquid and for compressed gas and nozzles for projecting liquid which are parallel to axis XX' and which open out on the lower face of the lower plate $\mathbf{39}_4$.

FIG. 5 shows a non-limiting example of a tool which comprises three nozzles whose axes P1, P2, P3 are offset both along axis ZZ' and along axis YY'. The three nozzles may respectively project three coloured liquids, different or identical, on the support 1 and there has been shown thereon a network of coloured dots in the course of execution, these dots being intended to represent a graphic.

At a given instant, the coordinates of mark C' associated with the tool-holder make it possible to define the coordinates of the three nozzles.

z designates the offset of two nozzles along axis ZZ' and y the offset of two successive nozzles along axis YY'. It is assumed that the offsets between axes P1 and P2 are equal to the offsets between axes P2 and P3.

The tool-holder is continuously displaced parallel to axis YY' and the projections of liquid are controlled during passage of each orifice in front of the dots P' distant by value p which may vary within the same program.

FIG. 5 shows limits L1, L2 parallel to axis ZZ' and limits L3 and L4 parallel to axis YY'. These limits define the frame within which the graphic to be made is located. These limits are determined by the data memorized with respect to the desired graphics and controlled by sensors 23 for L1 and L2 and by 25 for L3 and L4.

During displacement of the tool parallel to axis YY', each nozzle passes successively opposite theoretical points Q of the support and, at that instant, one or more of the nozzles are controlled by the central unit in order to project, or not, on each point Q of the support, a spot of coloured liquid.

FIG. 5 shows that the spots projected by each nozzle are aligned along lines parallel to axis YY', distant by z.

The central unit thus controls simultaneous scanning of three lines by three nozzles until the tool-holder reaches limit L1.

At that moment, the central unit controls displacement of the carriage 11 parallel to axis ZZ' by a value equal to z or a multiple of z and it again controls displacement of the tool-holder parallel to axis YY', in the direction opposite the preceding one until the tool-holder reaches limit L2.

The central unit repeats these operations until the carriage 11, which started from limit L3, reaches limit L4.

Upon passage in front of each theoretical point Q defined by the successive coordinates transmitted by the central unit, each of the nozzles projects, or not, a coloured liquid of determined colour, independently and autonomously.

FIG. 6 is an exploded view and FIG. 7 a section of the tool-holder shown in FIG. 5 passing through axis P of a nozzle.

These Figures show the four superposed rectangular plates $39_1$, $39_2$, $39_3$ . . . $39_n$ which are assembled together by tie-rods, gluing or by any other known assembly means.

The upper plate $39_1$ acts as cover. It comprises the electrical components and circuits. In particular it comprises sockets 40 in which are engaged pins for charging and sockets 41 for earthing.

Plate $39_2$, called membrane support plate, comprises a membrane 42 against the upper face of which are placed piezo-electric wafers 43, for example quartz wafers or piezo-electric ceramic elements which are energized by voltage impulses. Each wafer corresponds to one of the liquid injection nozzles.

The deformations of the piezo-electric wafers 43 are transmitted to the membrane 42 which acts as piston sucking and delivering the coloured liquid and which creates a drop of liquid during each impulse. The volume of the drops depends on the amplitude of the impulses.

The plate $39_2$ comprises sockets 44 for electrical connection in which are engaged connecting pins of the receiving piezo-electric wafer 51 shown in FIG. 7.

The function of plate $39_3$ is to bring coloured liquids to each nozzle. This plate comprises a number of liquid admission orifices 45 equal to the number of nozzles, for example three in the case of the Figure. Each orifice 45 receives a liquid of determined colour and communicates with a circular channel 46 which is made between the plates $39_2$ and $39_3$, astride them, and which guides the liquid via radial channels into an axial chamber 47 shown in FIG. 7, which shows that the chamber 47 is of revolution about the axis P of a nozzle and has the shape of a convergent nozzle, for example a nozzle of truncated section or with parabolic walls.

The function of plate $39_4$ is to bring into each nozzle a compressed gas which serves to project the coloured liquid contained in the chamber 47 in nozzle form. Plate $39_4$ comprises channels 48 of which the number corresponds to that of the nozzles. These channels are connected to a source of compressed gas. Each channel 48 communicates with a circular channel **48*a*, which is connected by radial channels to a second circular channel 48*b* coaxial to the first. FIG. 7 shows that each channel 48*b* communicates by inclined channels 49 with one of the liquid projecting nozzles 50**.

FIG. 7 is a section of a tool 0 passing through axis P of a nozzle, for example a transverse section through a plane defined by axes XX' and ZZ'.

This Figure shows the membrane 42 which is hermetically clamped between the plate $39_1$ and $39_2$. It is seen that the membrane 42 supports a first piezo-electric wafer 43 glued to its upper face and a second piezo-electric wafer 51 glued to its lower face. The two wafers are rigidly fixed to the membrane 42 by a conducting resin or by any other equivalent means.

The first wafer 43 is energized by voltage impulses which are transmitted by pins **40*a* engaged in the sockets 40**.

Pins **40*a* are connected by leads 52 shown in dotted lines, to a connector 53**.

The second wafer 51 picks up the deformations of the membrane 42 and converts them into voltage impulses which are transmitted to pins **44*a* engaged in the sockets 44. The sockets 44*a* are connected by a lead 54 to the connector 53**.

The amplitude of the voltage impulses emitted by the wafer 51 measures the amplitude of the deformations of the membrane which determines the volume of the drops and therefore enables the volume of the drops to be monitored.

The membrane 42 constitutes the upper limit of the axial chamber 47 which is made inside the plates $39_2$, $39_3$ and $39_4$ and which is defined for example by parabolic walls, of revolution about axis P, which converge continuously towards the outlet nozzle 50.

Seals 55 are interposed between the successive plates, along the edges thereof. On the other hand, as may be seen in FIG. 7, the central parts of plates $39_2$, $39_3$ and $39_4$ are in direct contact, with the result that the circular channels 46, **48*a*, 48*b*** as well as the radial channels are machined astride the joins of two successive plates, which facilitates machining.

FIG. 7 shows that the channels 49 which serve to inject a compressed gas open out in the viciniy of the outlet orifice of the nozzle 50 and are very inclined with respect to axis P.

Channels 49 open out in the nozzle slightly upstream of the meniscus **50*a* which limits the liquid when the piston 42** is in position of compression of the liquid, with the result that the jet of gas entrains the drops with it.

A coloured liquid is brought into each chamber 47 by a liquid distributor 56 which is connected to the connector 53 by a pipe 57 and which is connected on one of the orifices 45 equipping the plate $39_3$.

Similarly, compressed gas is brought to each pair of circular conduits **48*a*, 48*b* by an air distributor 58 which is connected to the connector 53 by a pneumatic pipe 59**.

Periodic cleaning of the axial chamber 47, of the channel 46, of the radial channels leaving from the latter and of the inlet channel 45 is obtained by interrupting the admission of coloured liquid and by connecting the distributor 56 by a pipe 60 to connector 53.

The connector 53 which manages all the tasks carried out by each nozzle is connected to an interface device 61 by a connection bus 61a.

The interface device 61 comprises an air/electric interface 63 for example electro-valves which electrically control the admission of compressed air on the various air distributor devices 58 equipping each nozzle of the same tool.

The interface device 61 also comprises a coloured liquid/electric interface 62, for example electro-valves which electrically control the admissions of coloured liquids to the various distributors 56 equipping each nozzle of the same tool.

The interface device comprises an interface 64 which controls the energization voltage sent onto pins 40a of the emitter wafers 43. It also comprises an interface 65a which controls connections with the receiving wafers 51.

Finally, the interface device comprises an interface 65 which makes it possible electrically to control the sending of a cleaning liquid on the pipes 60 after having interrupted the admission of coloured liquid.

The interface device 61 is connected to the central unit by a bus 66 by which the central unit sends to the interface devices 61 the logic control and monitoring signals.

FIG. 8 is a partial view on a larger scale of the coloured dots projected onto a flat support. The dots are circular and have diameters $\phi$ which are or are not equal.

The dots of the same diameter are equidistant on each line parallel to YY', the distance between dots being equal to e.

When one passes from one line to the following, the dots are offset in the direction of the line, with the result that a quincunx arrangement is obtained.

The spacing between successive lines and the lateral offset of the dots are such that the dots are disposed at the apices of equilateral triangles of which the sides are equal to $\phi$+e. This arrangement makes it possible to obtain a maximum density of dots per surface unit and contributes to obtaining high resolution graphics.

FIG. 9 schematically shows the general organization of the components and circuits of the central control station shown in FIG. 1.

Reference 67 represents a central processor which controls all the operations, dialoguing with other components via a central bus 68. The microprocessor 67 is connected to the central bus by a link bus 69.

The central bus comprises, for example, three specialized busses, namely an addressing bus 70, a data bus 71 and a monitoring bus 72.

Reference 73 represents mass memories which comprise for example a read/write RAM memory 73a and a read-only ROM memory 73b. Memories 73a and 73b are connected to the central bus by link busses 74a and 74b.

Reference 75 represents a control desk which is connected to the central bus by a link bus 76.

Reference 18 designates the digital image creation and analysis module shown in FIG. 1. This comprises read/write RAM memories and read-only ROM memories and it is connected to the central bus by a link bus 77.

Reference 78 represents a device for controlling the movements of the arm 9, the carriage 11 and the tool-holder 13. It is connected to the central bus by a link bus 79.

Reference 80 represents a device for controlling the interfaces 61 which is connected to the central bus by the link bus 66.

Reference 82 represents a device for treating the coloured liquids which is connected to the central bus by a link bus 83.

Reference 84 represents a module for monitoring different devices with which a machine according to the invention may be optionally equipped, for example device 37 which monitors marking. This module is connected to the central bus by a link bus 85.

What is claimed is:

1. A process for automatically writing a high-resolution polychrome graphic on a fixed support comprising the following successive operations:

mounting a plurality of nozzles, each projecting a liquid of a determined colour, on a tool-holder which is placed in front of said support and which is adapted to be displaced along three rectangular axes of which one is perpendicular to said support, automatically controlling the displacements of said tool-holder by a central processing unit with the result that each outlet orifice of a nozzle scans line by line a surface parallel to said support, which nozzles are perpendicular to said support and parallel to one another and are offset in the direction perpendicular to the scanning lines, so that they scan different lines, recording in the memory of said central unit the coordinates of a network of dots of the graphic and the colour of each dot and, during the displacements of the tool holder, measuring the successive real positions of each nozzle, comparing them with the coordinates recorded in the memory and, when the real position of a nozzle which projects a liquid of a determined colour coincides with the coordinates of a dot of the graphic of this same colour, the central unit causes the ejection of a drop of liquid via said nozzle onto said support so that a high-resolution polychrome graphic is obtained thereon which is composed of a network of juxtaposed monochromatic dots.

2. A device for automatically writing a high resolution polychome graphic on a support comprising a tool-holder which is adapted to be moved by three servo-motors along three rectangular axes of which the third is perpendicular to said support, which tool-holder comprises a casing which contains a plurality of tools which are disposed in rows parallel to a first and a second axis parallel to said support, with the result that the coordinates of each individual tool along said first and second axes are deduced from the coordinates of a determined point of said tool-holder by addition of constants, wherein each tool is equipped with a nozzle for projecting coloured liquid, and said device comprises a central processing unit which automatically controls said servo-motors to displace said tool-holder relative to said support along parallel scanning lines and which controls the projection of coloured liquid by said nozzles.

3. The device of claim 2 wherein each of said servo-motors is associated with an open loop which comprises a sensor which indicates the real position of said tool holder along said axes, and a comparator which compares at any instant said real position with a reference position transmitted by the central unit and which indicates to said central unit the instant when there is coincidence between said real position and said reference position.

4. The device of claim 2 of the type comprising a horizontal rail along which a vertical rail is displaced by a first of said servo-motors along said first axis (YY'), and a carriage which is displaced along said vertical rail by a second of said servo-motors along said second axes (ZZ'), said tool-holder being mounted on said carriage and being displaced by a third of said servo-motors along said third axis (XX'), wherein said horizontal rail is constituted by one side of a fixed, rigid, rectangular frame placed in front of said support and said vertical rail is displaced inside said frame.

5. The device of claim 2 , wherein each tool is composed of a stack of a plurality of plates superposed on one another and comprised a plurality of chambers each of which extends through said stack and which converges towards a nozzle for ejecting a liquid of determined colour contained in said each chamber.

6. The device of claim 5, wherein each chamber is defined, on the side opposite said nozzle, by a deformable membrane which bears on its face outside said chamber a piezo-electric wafer which is energized by electrical impulses controlled by said central unit, each impulse controlling the ejection of a drop of colored liquid and which membrane bears on its inner face a second piezo-electric wafer which picks up the displacements of said membrane.

7. The device of claim 5 comprising, around each nozzle, a circular channel for the passage of a compressed gas and from which issue inclined channels which open into said nozzle in the vicinity of the outlet orifice thereof, and which make it possible to send into the nozzle a flow of compressed gas to project drops of coloured liquid against said support.

8. The device of claim 5, wherein each tool comprises four superposed plates: a cover plate including electrical connections to said tool; a membrane support plate comprising a transverse membrane bearing on each of its two faces piezo-electric transducers, a plate for conducting coloured liquids comprising channels for distributing colored liquids to each of said chambers, and a lower plate comprising channels for admission of compressed gas and for injection thereof into each nozzle for ejecting coloured liquid.

9. The device of claim 8, comprising seals interposed between said plates along the edges thereof, said plates being applied directly against one another, and said channels for distributing coloured liquid and compressed air comprise aligned grooves in the contacting surfaces of adjacent pairs of said plates.

10. The device of claim 2, including a carriage on which is mounted said tool-holder, said carriage bearing a shape analysis device which is adapted to be displaced line by line in front of a curved support and which notes and memorizes the coordinates of the points of the support along said third axis, and said tool-holder is driven in rotation about two axes parallel to said first axis and to said second axis.

11. The device of claim 2, comprising an image creation and analysis unit, assisted by computer, which designs graphics and transmits to said central processing unit the coordinates of the points of said graphics in order automatically to produce the latter on said support.

* * * * *